(12) United States Patent
Plourde et al.

(10) Patent No.: US 12,396,525 B2
(45) Date of Patent: Aug. 26, 2025

(54) ZIPPER ASSEMBLIES HAVING POST-CONSUMER RECYCLATE MATERIAL

(71) Applicant: Illinois Tool Works Inc., Glenview, IL (US)

(72) Inventors: Eric Plourde, Frankfort, IL (US); Jose Septien, Naperville, IL (US); Marion Johnson, Hoffmann Estates, IL (US); Clifton R. Howell, Elburn, IL (US); Adrian Wenc, River Grove, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 210 days.

(21) Appl. No.: 18/303,098

(22) Filed: Apr. 19, 2023

(65) Prior Publication Data

US 2023/0346083 A1    Nov. 2, 2023

Related U.S. Application Data

(60) Provisional application No. 63/335,562, filed on Apr. 27, 2022.

(51) Int. Cl.
*A44B 19/16* (2006.01)
*B65D 33/25* (2006.01)
(Continued)

(52) U.S. Cl.
CPC .......... *A44B 19/16* (2013.01); *B65D 33/2508* (2013.01); *B29C 48/12* (2019.02);
(Continued)

(58) Field of Classification Search
CPC .... A44B 19/16; B65D 33/2508; B29C 48/12; B29C 2023/065; B29C 2105/26; B29C 2005/00
(Continued)

(56) References Cited

U.S. PATENT DOCUMENTS 5,066,444 A    11/1991  Behr
5,174,658 A *  12/1992  Cook ................. B65D 33/2541
                                              150/900

(Continued)

FOREIGN PATENT DOCUMENTS

EP    1740483 A1    1/2007
EP    1867579 A1    12/2007
(Continued)

OTHER PUBLICATIONS

Machine translation of JP 4496079 B2 (Year: 2010).*
(Continued)

*Primary Examiner* — Jes F Pascua
(74) *Attorney, Agent, or Firm* — The Small Patent Law Group LLC; Christopher R. Carroll (57) ABSTRACT

A zipper assembly is provided that may be coupled to a resealable enclosure. The zipper assembly may include flanges having opposite interior and exterior surfaces. The exterior surfaces of the flanges may be coupled with one or more films of the enclosure. The zipper assembly also may include locking members protruding from the flanges. The locking members may mate with each other to close the enclosure and to separate from each other to open the enclosure. The flanges and the locking members may be formed from a non-common material and a common material.

11 Claims, 5 Drawing Sheets

(51) Int. Cl.
    *B29C 48/12*     (2019.01)
    *B29K 23/00*     (2006.01)
    *B29K 105/26*     (2006.01)
    *B29L 5/00*     (2006.01)

(52) U.S. Cl.
    CPC .... *B29K 2023/065* (2013.01); *B29K 2105/26* (2013.01); *B29L 2005/00* (2013.01)

(58) Field of Classification Search
    USPC .......................................................... 383/63
    See application file for complete search history.

(56) References Cited

U.S. PATENT DOCUMENTS

| | | | |
|---|---|---|---|
| 5,655,273 A | | 8/1997 | Tomic et al. |
| 5,664,296 A | * | 9/1997 | May ................ B65D 33/2541 24/585.12 |
| 6,713,152 B2 | | 3/2004 | Chen et al. |
| 7,290,660 B2 | * | 11/2007 | Tilman .............. B65D 81/2038 206/524.8 |
| 7,328,789 B2 | | 2/2008 | Bohanan et al. |
| 7,497,623 B2 | | 3/2009 | Thomas et al. |
| 7,908,789 B2 | | 3/2011 | Dobbs et al. |
| 8,012,554 B2 | | 9/2011 | Shelley et al. |
| 9,896,241 B2 | | 2/2018 | Anzini et al. |
| 11,021,322 B1 | | 6/2021 | Oscar |
| 2011/0069911 A1 | * | 3/2011 | Ackerman ......... B65D 21/0233 383/64 |
| 2014/0314343 A1 | * | 10/2014 | Saito ..................... B65D 33/25 264/177.1 |
| 2014/0345088 A1 | * | 11/2014 | Kobayashi ........... B32B 27/308 24/30.5 R |
| 2015/0183556 A1 | | 7/2015 | Shioda |
| 2017/0298308 A1 | | 10/2017 | Labeque et al. |
| 2020/0231341 A1 | * | 7/2020 | Dais .................. B65D 33/2566 |

FOREIGN PATENT DOCUMENTS

| | | | |
|---|---|---|---|
| EP | 2694384 A1 | | 2/2014 |
| EP | 2834158 A1 | | 2/2015 |
| JP | 2008154767 A | | 7/2008 |
| JP | 4496079 B2 | * | 7/2010 ........... B65D 33/007 |
| WO | 2004031042 A1 | | 4/2004 |
| WO | 2021116864 A1 | | 6/2021 |
| WO | 2021124243 A1 | | 6/2021 |

OTHER PUBLICATIONS

International Search Report and Written Opinion mailed Aug. 16, 2023 for corresponding International Application No. PCT/US2023/066003 (12 pages).

International Preliminary Report on Patentability mailed Nov. 7, 2024 for corresponding International Application No. PCT/US2023/066003 (8 pages).

* cited by examiner

ZIPPER ASSEMBLIES HAVING POST-CONSUMER RECYCLATE MATERIAL

CROSS-REFERENCE TO RELATED APPLICATIONS

This application claims priority to U.S. Provisional Application No. 63/335,562 (filed 27 Apr. 2022), the entire disclosure of which is incorporated herein by reference.

BACKGROUND

Technical Field

The subject matter described herein relates to zipper assemblies used to close resealable enclosures.

Discussion of Art

Flexible enclosures can hold a variety of material. One example of a flexible enclosure is a pre-formed pouch enclosure that is filled with the material. The pouch enclosure is then sealed with the material inside and then may be presented to customers or consumers. The enclosure may include a resealable zipper assembly that permits a consumer to repeatedly open and close the enclosure.

Post-consumer recyclate (PCR) material is generated by consumers that use products made from plastics, or the plastic material to package products, and put into the recycle stream after use. Recycled plastic can then be melted down and formed into pellets so that the recyclate can be used in new products or packaging. PCR material is often made from plastic packaging that has been used to contain liquid foodstuffs such as milk, juices, condiments, and the like. There are increasing desires to use more PCR material to reduce waste. Yet, however, PCR material may not be largely used in resealable enclosures.

PCR material is one type of non-common material that is currently not used in large quantities in the manufacture of resealable enclosures, such as bags. Another type of non-common material is high density polyethylene (HDPE). This material and others may not be used in large amounts (or at all) in enclosures or bags used to store consumable materials (e.g., food) due to regulatory limitations.

It may be desirable to have enclosures that differs from those that are currently available.

BRIEF DESCRIPTION

In one example, a zipper assembly is provided that may be coupled to a resealable enclosure. The zipper assembly may include flanges having opposite interior and exterior surfaces. The exterior surfaces of the flanges may be coupled with one or more films of the enclosure. The zipper assembly also may include locking members protruding from the flanges. The locking members may mate with each other to close the enclosure and to separate from each other to open the enclosure. The flanges and the locking members may be formed from a non-common material and a common material.

In another example, a method for providing a zipper assembly is provided. The method may include extruding flanges and locking members protruding from the flanges. The flanges may be extruded to have opposite interior and exterior surfaces. The exterior surfaces of the flanges may be formed in shape(s) to be coupled with one or more films of a flexible enclosure. The locking members may be extruded in shapes that may mate with each other to close the enclosure and to separate from each other to open the enclosure. The flanges and the locking members may be formed from a non-common material and a common material.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide a zipper assembly for a recloseable enclosure that incorporates non-common materials, such as PCR material, HDPE, other materials that are not currently approved by the Food And Drug Administration of the United States as of the filing date of this patent application for contact with food. While some examples describe use of PCR material, these embodiments also may incorporate other non-common materials that are not PCR material instead of or in addition to the PCR material.

Figure 1:
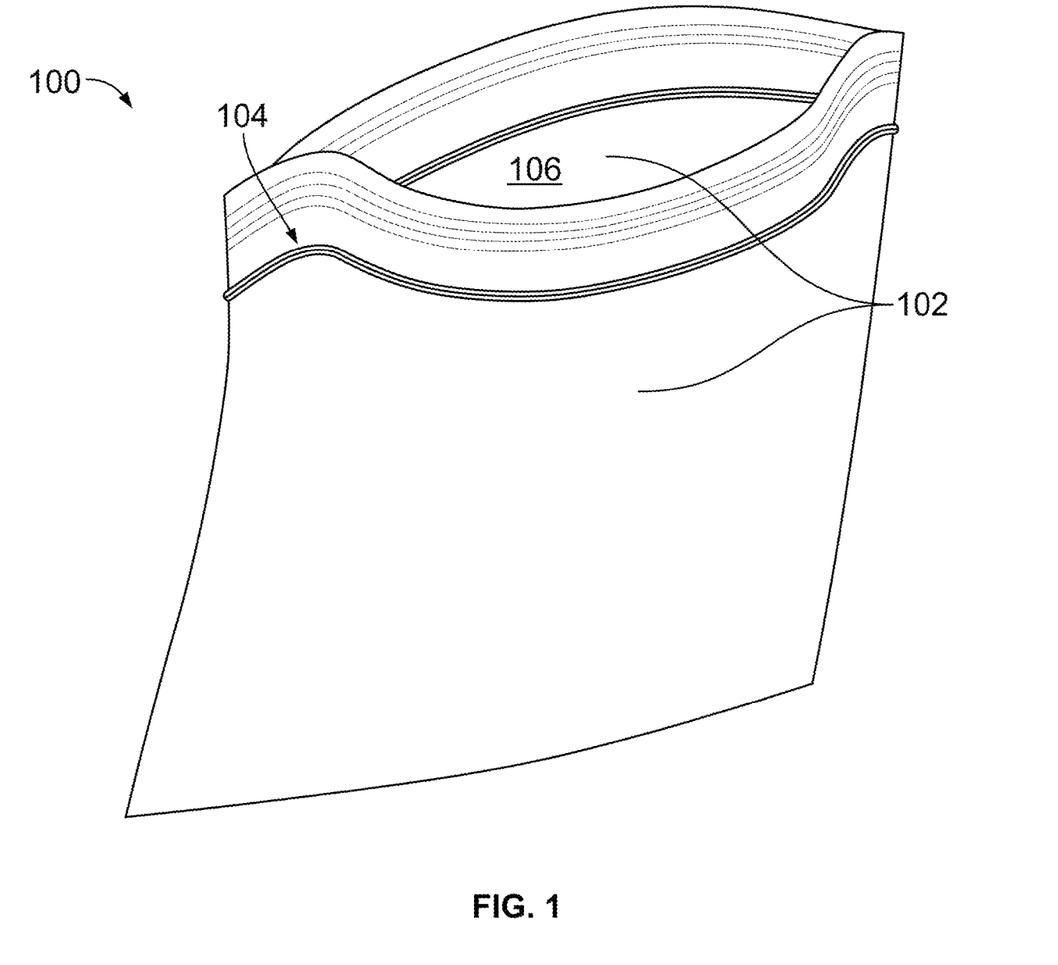
FIG. 1 illustrates one example of a recloseable or resealable enclosure.

FIG. 1 illustrates one example of a recloseable or resealable enclosure 100. The enclosure 100 may be a flexible enclosure that includes one or more films 102 formed in the shape of an open-ended bag. A zipper assembly 104 may be coupled with the films 102 at or near an opening 106 of the enclosure 100. The zipper assembly 104 may attach to itself to allow a consumer to repeatedly open and close the enclosure 100. The films 102 and/or zipper assembly 104 may be formed from one or more polymers, and may include non-common material as described herein.

Figure 2:
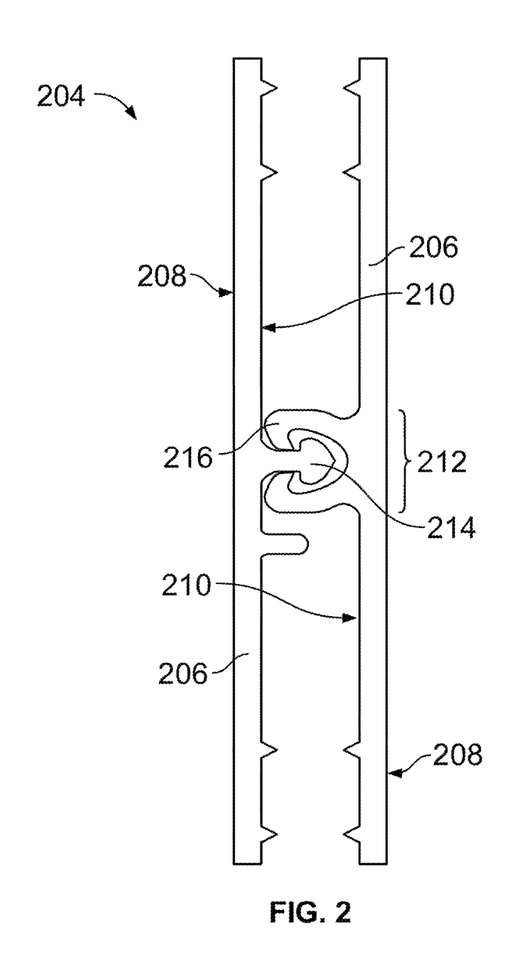
FIG. 2 illustrates a cross-sectional view of one example of a zipper assembly.

FIG. 2 illustrates a cross-sectional view of one example of a zipper assembly 204. The zipper assembly 204 can represent the zipper assembly 104 shown in FIG. 1. The zipper assembly 204 includes opposing predominantly flat flanges 206 having outer surfaces 208 that face away from each other. These outer surfaces 208 may be coupled (e.g., via heat sealing, an adhesive, or the like) to the films 102 (shown in FIG. 1) of the enclosure 100 (also shown in FIG. 1).

Opposite inner surfaces 210 of the flanges 206 can face each other. The inner surfaces 210 of the flanges 206 include interlocking or locking elements 212 that protrude from the inner surfaces 210 toward the other flange 206. These locking elements 212 may mate with each other to close the zipper assembly 204 (and enclosure 100). The locking elements 212 may be pulled apart (e.g., by a consumer pulling on opposite sides of the films 102 and/or the flanges 206) to open the enclosure 100. In the illustrated example, one flange 206 includes male locking elements 214 and the other flange 206 includes female locking elements 216. As shown, the female locking elements 216 may be receptacles shaped to receive and secure outer ends of the male locking elements 214 (to keep the enclosure 100 closed). Pulling the flanges 206 and/or films 102 apart may remove the male locking elements 214 from the female locking elements 216 to open the enclosure 100. In one example, a slider may be used that moves along the length of the zipper assembly 204 (e.g., into and out of the plane of FIG. 2) to open or close the zipper assembly 204 and enclosure 100. Alternatively, the zipper assembly 204 may be opened or closed without the slider.

The body of the zipper assembly 204 may incorporate non-common material. For example, the entirety of the flanges 206 and locking elements 214, 216 may be formed from non-common material or a combination of non-common and common materials. The virgin material may be a polymer or other type of material that is not PCR (e.g., virgin resin), is not HDPE, or is a material that is currently approved by the Food And Drug Administration for contact with food. The non-common material and/or the combination of the non-common and common material may be extruded and shaped into the zipper assembly 204. As shown in FIG. 2, the non-common material may extend through all of the zipper assembly 204 such that the zipper assembly 204 is formed as a homogenous mixture. For example, the percentage or content of the PCR material relative to the non-PCR material may be consistent or the same throughout the entirety of the zipper assembly 204 (such as by not varying more than 1% or another manufacturing allowance). Alternatively, different areas, volumes, or regions of the body of the zipper assembly 204 may have different percentages, weights, or amounts of the PCR material relative to non-PCR material.

Figure 3:
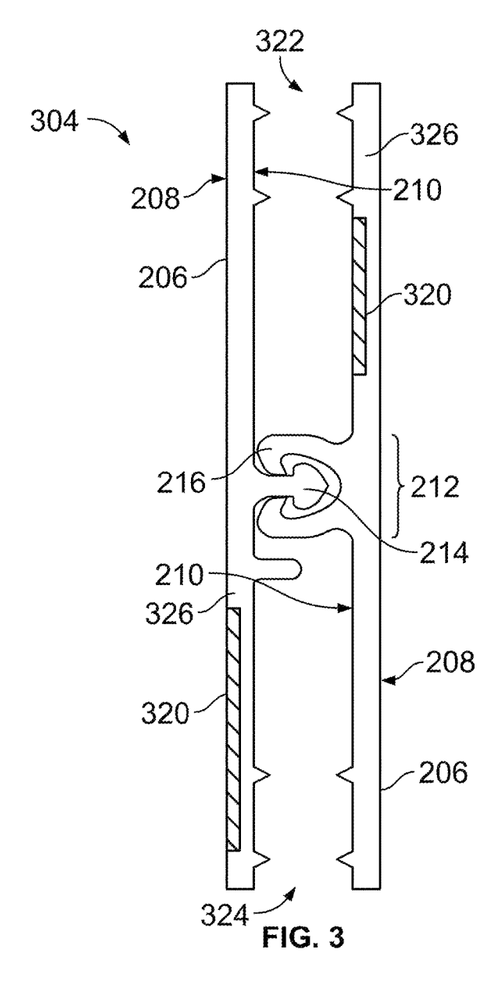
FIG. 3 illustrates a cross-sectional view of another example of a zipper assembly.

FIG. 3 illustrates a cross-sectional view of another example of a zipper assembly 304. The zipper assembly 304 can represent the zipper assembly 104 shown in FIG. 1. Similar to the zipper assembly 204 shown in FIG. 2, the zipper assembly 304 may include the flanges 206 and interlocking or locking elements 212. One difference between the zipper assemblies 204, 304 shown in FIGS. 2 and 3 is the location of where PCR material is located within the zipper assemblies 204, 304. As described above, the zipper assembly 204 may include the PCR material dispersed or mixed throughout the entirety of the flanges 206 and locking elements 212.

In contrast, the zipper assembly 304 may include localized, exposed volumes or portions 320 that include the PCR material, while other volumes or portions 326 of the zipper assembly 304 do not include the PCR material. These other volumes or portions 326 of the zipper assembly 304 may be formed from virgin or other non-PCR material. The PCR-containing volumes 320 may include a blend of PCR and non-PCR (e.g., virgin material that has not been recycled) materials. Optionally, the PCR-containing volumes 320 may be formed from only PCR material (and not include non-PCR or virgin material).

The PCR-containing volumes 320 may be exposed as shown in FIG. 3. For example, at least one side or surface 324 of the PCR-containing volumes 320 may be open to the external or ambient atmosphere that is outside of the zipper assembly 304. The PCR-containing volume 320 in one flange 206 may extend along and be exposed along the outside surface 208 of the flange 206. The PCR-containing volume 320 in another flange 206 may extend along and be exposed along the inside surface 210 of the flange 206. Optionally, the PCR-containing volumes 320 in both flanges 206 may extend along and be exposed along the inside surface 210 but not the opposite outside surface 208. In another example, the PCR-containing volumes 320 in both flanges 206 may extend along and be exposed along the outside surface 208 but not the opposite inside surface 210.

As shown in FIG. 3, the PCR-containing volumes 320 may not extend through an entirety of the thickness of the flanges 206. For example, the PCR-containing volume 320 in a flange 206 may extend from the inside surface 210 toward the opposite outside surface 208 of the same flange 206 but without extending the entire way to the outside surface 208. The PCR-containing volume 320 in a flange 206 may extend from the outside surface 208 toward the opposite inside surface 219 of the same flange 206 but without extending the entire way to the inside surface 210, as shown in FIG. 3.

The PCR-containing volumes 320 may be in locations in the flanges 206 that do not expose the contents of the enclosure 100 (shown in FIG. 1) to the PCR material. For example, one side or end of the zipper assembly 304 may be referred to as a consumer side 322 as this side faces or is closer to the consumer when the consumer is handling or opening the enclosure 100. The opposite side or end of the zipper assembly 304 may be referred to as a product side 324 as this side faces or is closer to the product held in the interior of the enclosure 100.

The PCR-containing volume 320 in each flange 206 may be exposed to a side of that flange 206 that is not also exposed to the interior of the enclosure 100 where product is held. For example, the PCR-containing volume 320 that is exposed along the inside surface 210 of the flange 206 may be located above the locking members 212 and closer to the consumer side 322 of the zipper assembly 304 than the locking members 212. The PCR-containing volume 320 that is exposed in the other flange 206 may be exposed along the outside surface 208. These locations of the PCR-containing volumes 320 prevents the product inside the enclosure 100 from being exposed to or contacting the PCR material. Additionally, the PCR-containing volume 320 that is exposed along the outer surface 208 of the flange 206 may be sealed between the remainder of this flange 206 and the enclosure film 102 that is sealed to the flange 206. This can enclose the PCR-containing volume 320 from the external environment.

While PCR material may be cleaned prior to being formed into pellets (which are then melted during the extrusion process), there may often be an undesirable residual odor associated with the PCR material. This odor can remain even after the PCR resin has been formed into a new product or package. Masking this odor can make products, including the product's packaging, made from the PCR material much more palatable to consumers. Trash bags have incorporated fragrances not only to mask the scent of the trash contained in the bag, but also to mask the use of PCR material in the construction of the trash bag. But requiring such fragrances to be added to products incorporating PCR material may increase the cost and limit the availability of enclosures that include PCR material. Placing the PCR material in locations that are not exposed to the product inside the enclosure 100 can prevent any odors of the PCR material from impacting or changing the odor of the product inside the enclosure 100. Additionally, by including the PCR material in the limited volumes 320 (and not throughout the zipper assembly 304) can reduce the odor caused by the PCR material and/or the amount of fragrance material needed to mask the odor of the PCR material.

Figure 4:
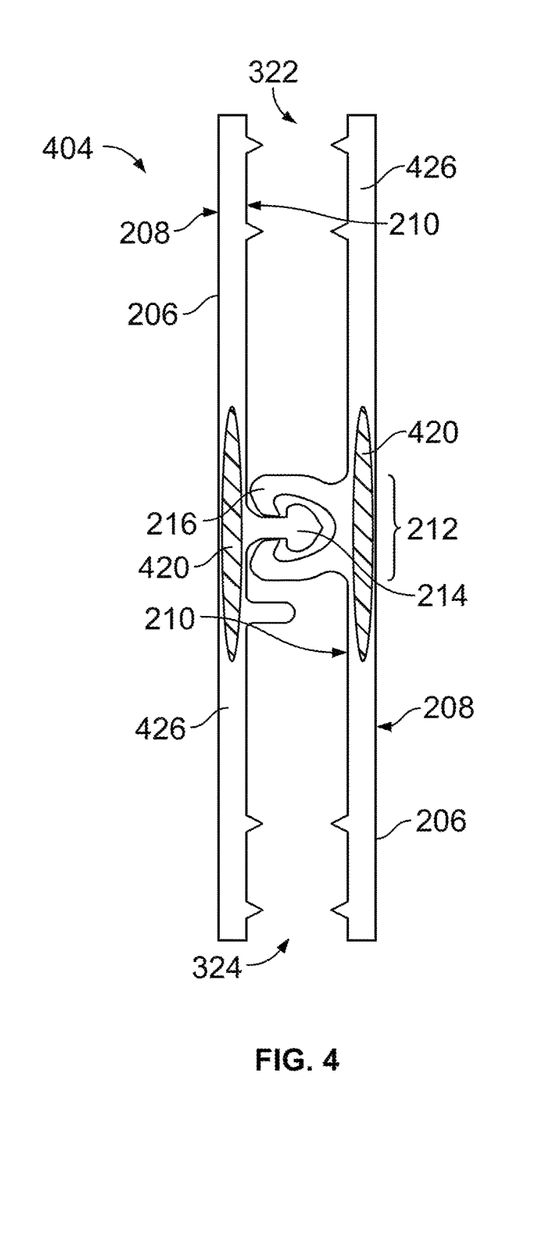
FIG. 4 illustrates a cross-sectional view of another example of a zipper assembly.

FIG. 4 illustrates a cross-sectional view of another example of a zipper assembly 404. The zipper assembly 404 can represent the zipper assembly 104 shown in FIG. 1. Similar to the zipper assembly 204 shown in FIG. 2, the zipper assembly 404 may include the flanges 206 and interlocking or locking elements 212. One difference between the zipper assemblies 204, 304, 404 shown in FIGS. 2 through 4 is the location of where PCR material is located within the zipper assemblies 204, 304, 404. As described above, the zipper assembly 204 may include the PCR material dispersed or mixed throughout the entirety of the flanges 206 and locking elements 212, and the zipper assembly 304 includes the PCR material in regions that are exposed to the areas outside of the zipper assembly 304. The PCR material is exposed to the outside of the zipper assembly 204, 304 in both of these zipper assemblies 204, 304.

In contrast, the zipper assembly 404 may include localized, internal volumes or portions 420 that include the PCR material, while other volumes or portions 426 of the zipper assembly 404 do not include the PCR material. These other volumes or portions 426 of the zipper assembly 404 may be formed from virgin or other non-PCR material. The PCR-containing volumes 420 may include a blend of PCR and non-PCR (e.g., virgin material that has not been recycled) materials. Optionally, the PCR-containing volumes 420 may be formed from only PCR material (and not include non-PCR or virgin material).

The PCR-containing volumes 420 may not be exposed as shown in FIG. 4. For example, each volume 420 that includes PCR material may be entirely surrounded by the volumes 426 that do not include the PCR material. For example, no part of any PCR-containing volume 420 in the zipper assembly 404 may be open to the external or ambient atmosphere that is outside of the zipper assembly 404. The volumes 420 may be entirely encapsulated or contained within the surrounding non-PCR material. This can contain the PCR material and prevent odor from the PCR material from being exposed to the consumer and/or product in the enclosure 100.

In one embodiment, the zipper assembly 104 of the enclosure 100 includes only the exposed PCR volumes 320 or the non-exposed (or encapsulated) PCR volumes 420. Alternatively, the zipper assembly 104 of the enclosure 100 may include both the exposed PCR volumes 320 and the encapsulated PCR volumes 420.

Localizing the PCR resin in the zipper assemblies 304, 404 in contrast to the PCR resin dispersed throughout the zipper assembly 204 can be advantageous as localizing the PCR material can be located in a sealant layer (where it is sealed to the film 102 of the enclosure 100 and is less exposed) or localized away from the important functional areas of the zipper assemblies 304, 404 like the locking elements 214, 216. Encapsulating the PCR material can help reduce odors from reaching the consumer and can isolate PCR material that may not be approved for direct food contact (where food is contained within the enclosure 100). In any of the zipper assemblies 204, 304, 404, the PCR and virgin (e.g., non-PCR) resins can have varying blend ratios of PCR to virgin resin. For example, the encapsulated regions 420 of PCR material could be 100% PCR resin, while the rest of the zipper assembly 404 (e.g., the regions other than the encapsulated regions 420) has a low level blend of PCR that does not significantly affect the odor of the zipper assembly 404.

The fragrance can be added to any of the resin streams during extrusion of the zipper assemblies 204, 304, 404. The fragrance can also be isolated to specific areas or features of the zipper assemblies 204, 304, 504. This can reduce the cost and/or complexity involved in dispersing the fragrance throughout larger areas or volumes of the zipper assemblies 204, 304, 504.

The supply of PCR containing resin material for use in creating the zipper assemblies 104 having PCR material incorporated into the zipper assemblies 104 may be limited or in short supply to at least some manufacturers. Accordingly, it may not be possible to manufacture all of the zipper assembly 104 using PCR resin on a large scale. Therefore, another example of the inventive subject matter described herein uses the PCR resin to form part, but not all, of the zipper assembly 104.

Figure 5:
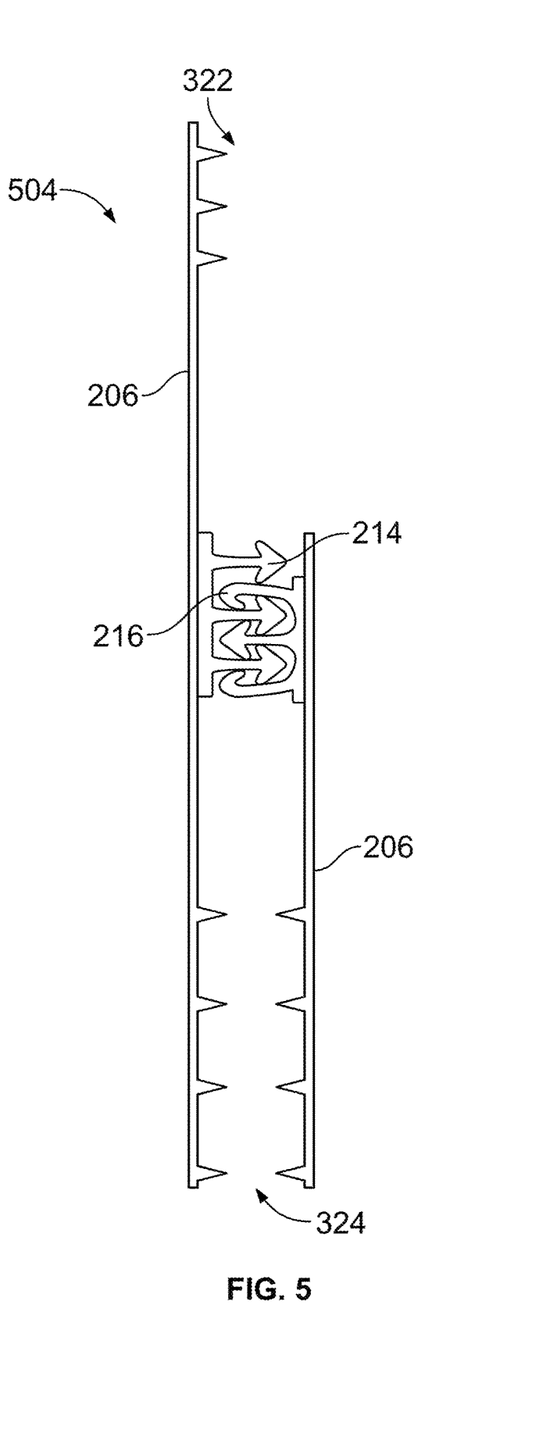
FIG. 5 illustrates a cross-sectional view of one example of a zipper tape assembly.

FIG. 5 illustrates a cross-sectional view of one example of a zipper tape assembly 504. The zipper tape assembly 504 includes the locking elements 214, 216 coupled with the flanges 206 shown in FIG. 2. The zipper tape assembly 504 may include more rows of the locking elements 214, 216 than the zipper assemblies 204, 304, 504. One difference between the zipper tape assembly 504 and the zipper assemblies 204, 304, 404 shown in FIGS. 3 through 5 (that also can represent the zipper assembly 104) is the locking elements 214, 216 are formed separate from the flanges 206 and then subsequently joined with the flanges 206 (instead of the locking elements 214, 216 and the flange 206 being formed at the same time as a single body). For example, the locking elements 214, 216 may be formed (e.g., extruded) and then heat bonded or otherwise adhered to the flanges 206.

Another difference between the zipper tape assembly 504 and the zipper assemblies 204, 304, 404 is that the locking elements 214, 216 and the flanges 206 may be formed from or include PCR material, while other parts of the enclosure do not include PCR material. The flanges 206 and the locking elements 214 and/or 216 may be formed entirely from PCR material. Alternatively, the flanges 206 and the locking elements 214 and/or 216 may be formed from a homogenous mixture of non-PCR material and PCR material. For example, the entirety of each of the flanges 206, the entirety of the locking elements 214, and/or the entirety of each of the locking elements 216 may be formed similar to the locking elements 214, 216 and flanges 206 in the zipper assembly 204.

Alternatively, the flanges 206 and the locking elements 214 and/or 216 may be formed from non-PCR material with exposed portions of PCR material in the flanges 206 and/or locking elements 214 and/or 216.

Alternatively, the flanges 206 and the locking elements 214 and/or 216 may be formed from non-PCR material with encapsulated portions of PCR material in the flanges 206 and/or locking elements 214 and/or 216.

Figure 6:
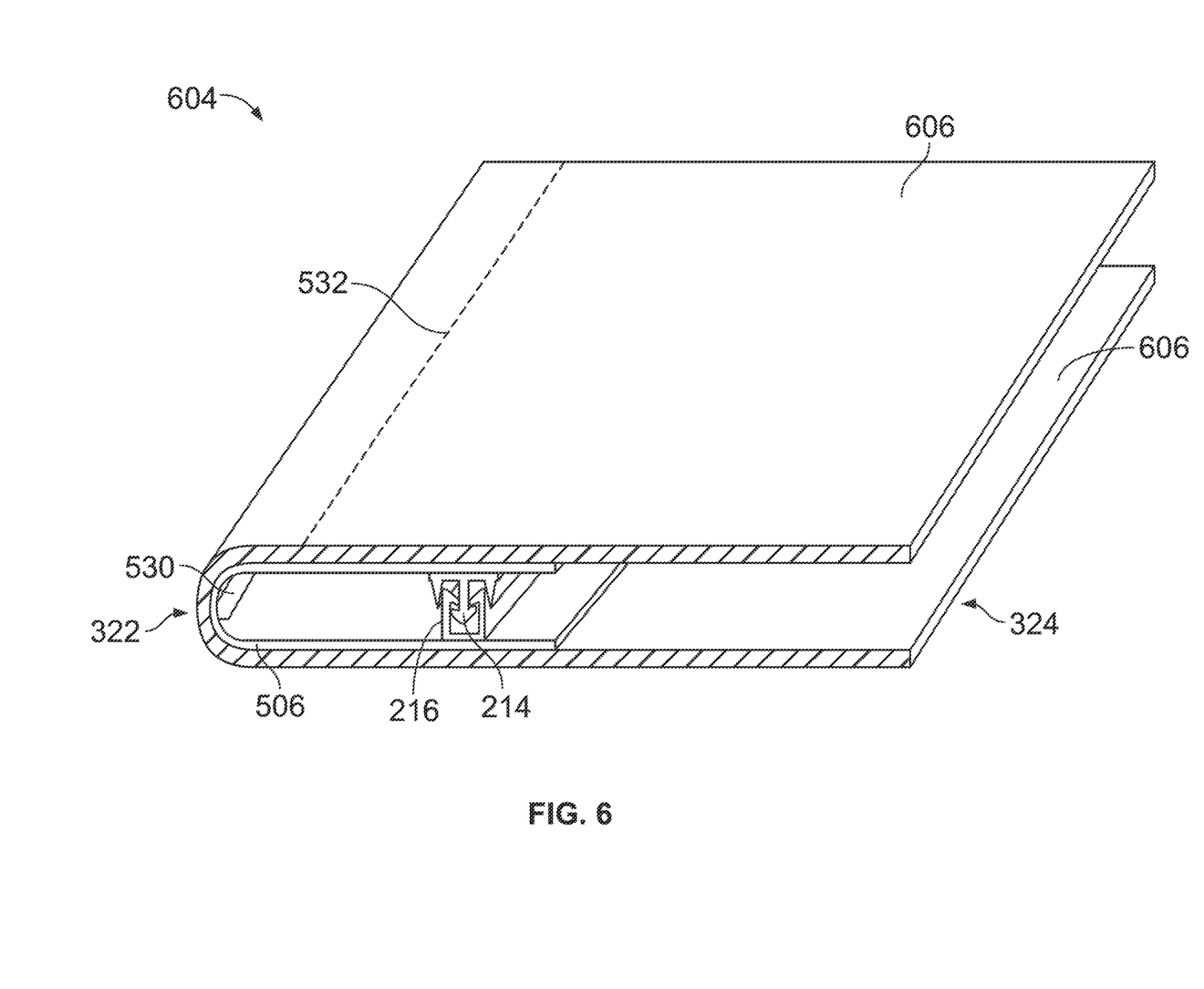
FIG. 6 illustrates a cross-sectional view of another example of a zipper tape assembly.

FIG. 6 illustrates a cross-sectional view of another example of a zipper tape assembly 604. The zipper tape assembly 604 includes the locking elements 214, 216 shown in FIG. 2 interconnected with a cap or base layer of material 506. The zipper tape assembly 604 can include the locking elements 214, 216 coupled with the cap or base layer 506, which is then coupled with flanges 606. The locking elements 214, 216 can be partially or entirely formed from PCR material, as described above.

One difference between the zipper tape assembly 604 and the zipper assemblies 204, 304, 404 and the zipper tape assembly 504 shown in FIGS. 3 through 5 is the presence of a tear bead 530 and the continuous flange 606. The flange 606 may be continuous from one side of the zipper tape assembly 504 to the opposing mating side of the zipper tape assembly 504. For example, the flange 606 may have an inverted U-shape at the consumer end 322 of the enclosure 100 or zipper tape assembly 604. This shape of the flange 606 can provide an additional barrier to ingress of external material into the interior of the enclosure 100. The flange 606 can be coupled (e.g., heat sealed) to the films 102 of the enclosure 100. The flange 606 can be formed from extruded material or another material. For example, the flange 606 can be formed from non-PCR material. Alternatively, at least part of the flange 606 may include PCR material.

The enclosure films 102 and the flange 606 can include a demarcated line of weakness 532, such as a line of perforations. The tear bead 530 can be an elongated tube, cylinder, or other shape between the flange 606 and the zipper tape assembly 604. The tear bead 530 can provide structure that can be grasped (e.g., through the base film 530) by a consumer and used to tear the flange 606 along the line of weakness 532 to expose or provide access to the zipper tape assembly 604.

The tear bead 530 may be formed entirely of PCR material in one example. Alternatively, the tear bead 530 may be formed from a mixture of PCR and non-PCR materials, similar to the zipper assembly 204 shown in FIG. 2. In another example, the tear bead 530 may be formed from non-PCR material with one or more of the exposed portions 320 of the PCR material. In another example, the tear bead 530 may be formed from non-PCR material with one or more encapsulated portions 420 of the PCR material.

Figure 7:
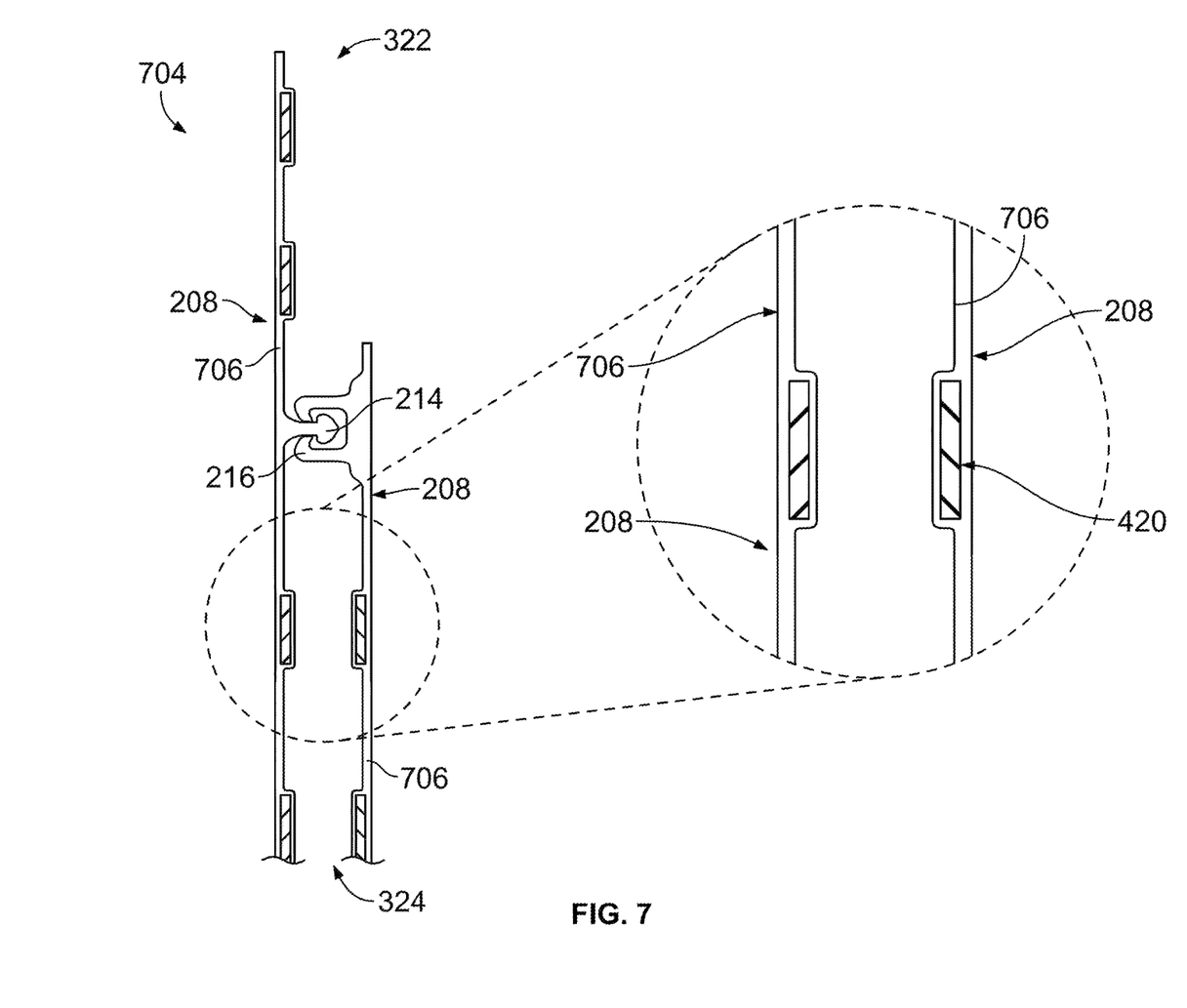
FIG. 7 illustrates another example of a zipper assembly.

FIG. 7 illustrates another example of a zipper assembly 704. The zipper assembly 704 may represent the zipper assembly 104 shown in FIG. 1. The zipper assembly 704 includes flanges 706 from which the locking elements 214, 216 protrude. The flanges 706 may include the encapsulated regions or portions 420 of PCR-containing material without the locking elements 214, 216 including PCR material. Alternatively, one or more of the locking elements 214, 216 may also include PCR material (encapsulated, exposed, or homogeneously mixed with virgin material). In contrast to the encapsulated regions 420 of PCR material shown in FIG. 4, the encapsulated regions 420 shown in FIG. 7 are disposed in the flanges 706 in locations that are between (a) the locking elements 214, 216 and the consumer end 322 and between (b) the locking elements 214, 216 and the product end 324, but not between the exterior surface 208 of the flanges 706 and the locking elements 214, 216. Alternatively, one or more of the encapsulated regions 420 may be between the exterior surface 208 of the flanges 706 and the locking elements 214, 216.

Optionally, one or more regions or the entirety of components described as being formed from or including PCR material may instead be formed from or include other non-common materials. PCR material may be a non-common material, as are other non-food grade resins or non-FDA approved materials. By encapsulating these materials within common materials or FDA approved materials (e.g., not PCR resins), these non-common materials can be used in enclosures 100 that store or hold food without introducing risk to the consumer.

Optionally, one or more regions or the entirety of the components described as being formed from or including PCR material may instead be formed from a stiffer material, such as HDPE, cyclic olefin copolymers (COC), or the like. This can help provide stiffness to the zipper assemblies.

Optionally, one or more of the encapsulated regions or portions 420 may include stiffer materials (e.g., stiffer or more resilient to bending) than the materials from which other portions of the zipper assembly 704 and/or enclosure 100 is formed. For example, the encapsulated regions 420 can represent elongated volumes (extending into and out of the plane of FIGS. 4 and/or 7) filled or including a polymer that has a greater or larger elastic modulus (or modulus of elasticity) than the polymer(s) that the regions outside of the encapsulated regions 420 and/or the remainder of the enclosure 100 are formed. This can allow zipper assemblies 104 previously applied to the enclosure films 102 by applying the zipper assemblies 104 in the machine direction (e.g., the direction that extends from the consumer end 322 toward the product end 324) to zipper assemblies 104 that are applied to the enclosure films 102 along a transverse direction (e.g., a direction that is perpendicular to the machine direction but parallel to the surfaces defined by the enclosure films 102). The stiffer materials in the encapsulated regions 420 can provide the required stiffness for moving the zipper assemblies 104 in this transverse direction.

The zipper assemblies described herein may be created by a method involving extruding the common and non-common materials into shapes that form the zipper assemblies described herein. For example, the common and non-common materials may be extruded simultaneously, may be co-extruded (e.g., separately extruded but extruded at the same time and combined), or may be separately extruded at different times and then combined.

In one example, a zipper assembly is provided that may be coupled to a resealable enclosure. The zipper assembly may include flanges having opposite interior and exterior surfaces. The exterior surfaces of the flanges may be coupled with one or more films of the enclosure. The zipper assembly also may include locking members protruding from the flanges. The locking members may mate with each other to close the enclosure and to separate from each other to open the enclosure. The flanges and the locking members may be formed from a non-common material and a common material.

The non-common material may be PCR material and the common material may be non-PCR material. Optionally, the non-common material may be high density polyethylene (HDPE), and the common material may be polyethylene (PE).

The flanges and the locking members may be formed from a homogenous mixture of the non-common material and the common material. Optionally, the flanges may include exposed regions formed from the non-common material with the locking members and a remainder of the flanges that is outside of the exposed regions formed from the common material. The exposed regions of the flanges may be disposed along an outer surface of the flanges. The exposed regions of the flanges may be in locations that do not contact a product inside the enclosure once the flanges are coupled with the one or more films of the enclosure. A first exposed region of the exposed regions may be disposed between the locking members and a consumer end of the zipper assembly. A second exposed region of the exposed regions may be disposed between the locking members and a product end of the zipper assembly that is opposite the consumer end. The second exposed region on the outer surface of the flanges may be opposite a side of the flanges that the locking members protrude.

The flanges may include encapsulated regions formed from the non-common material with the locking members and a remainder of the flanges that is outside of the encapsulated regions formed from the common material. The encapsulated regions may be entirely surrounded by the non-common material. The non-common material may have a greater modulus of elasticity than the common material. The locking members may be formed from the non-common material and the flanges may be formed from the common material. The zipper assembly optionally may include a tear bead formed from the non-common material.

In another example, a method for providing a zipper assembly is provided. The method may include extruding flanges and locking members protruding from the flanges. The flanges may be extruded to have opposite interior and exterior surfaces. The exterior surfaces of the flanges may be formed in shape(s) to be coupled with one or more films of a flexible enclosure. The locking members may be extruded in shapes that may mate with each other to close the enclosure and to separate from each other to open the enclosure. The flanges and the locking members may be formed from a non-common material and a common material.

The non-common material may be PCR material and the common material may be non-PCR material. Optionally, the non-common material may be HDPE, and the common material may be PE.

The flanges and the locking members may be formed from a homogenous mixture of the non-common material and the common material. The flanges may include exposed regions formed from the non-common material with the locking members and a remainder of the flanges that is outside of the exposed regions may be formed from the common material. The flanges may be extruded to include encapsulated regions formed from the non-common material with the locking members and a remainder of the flanges that is outside of the encapsulated regions may be formed from the common material.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A zipper assembly configured to be coupled to a resealable enclosure, the zipper assembly comprising:
   first and second flanges each having opposite interior and exterior surfaces, the exterior surfaces of the first and second flanges configured to be coupled with one or more films of the enclosure; and
   locking members protruding from the flanges, the locking members configured to mate with each other to close the enclosure and to separate from each other to open the enclosure,
   wherein the first flange includes a first volume that is thinner than the first flange and the second flange includes a second volume that is thinner than the second flange, the first volume only extending along and exposed to an external atmosphere along the interior surface of the first flange on a consumer side of the locking members, the second volume only extending along the exterior surface of the second flange on a product side of the locking members, the first and second volumes of the first and second flanges formed from a post-consumer recyclate (PCR) material and a remainder of the first and second flanges formed from a non-PCR material.

2. The zipper assembly of claim 1, wherein the PCR material includes high density polyethylene (HDPE), and the non-PCR material is polyethylene (PE).

3. The zipper assembly of claim 1, wherein the second volume in the second flange is in a location that does not contact a product inside the enclosure once the first and second flanges are coupled with the one or more films of the enclosure.

4. The zipper assembly of claim 1, wherein the PCR material has a greater modulus of elasticity than the non-PCR material.

5. The zipper assembly of claim 1, wherein the first volume is in the first flange and the second volume is in the second flange in locations that do not expose contents in the enclosure to the PCR material while the zipper assembly is coupled with the enclosure.

6. The zipper assembly of claim 1, wherein the second volume in the second flange is sealed between the remainder of the second flange and the one or more films of the enclosure when the exterior surface of the second flange is coupled with the one or more films of the enclosure.

7. A flexible enclosure comprising:
   one or more films formed in a shape of an open-ended bag; and
   a zipper assembly configured to be coupled to the one or more films, the zipper assembly including first and second flanges each having opposite interior and exterior surfaces, the exterior surfaces of the first and second flanges configured to be coupled with one or more films of the enclosure, the zipper assembly also including locking members protruding from the first and second flanges, the locking members configured to mate with each other to close the enclosure and to separate from each other to open the enclosure,
   wherein the first flange includes a first volume that is thinner than the first flange and the second flange includes a second volume that is thinner than the second flange, the first volume only extending along and exposed to an external atmosphere along the interior surface of the first flange on a consumer side of the locking members, the second volume only extending along the exterior surface of the second flange on a product side of the locking members, the first and second volumes of the first and second flanges formed from a post-consumer recyclate (PCR) material and a remainder of the first and second flanges formed from a non-PCR material.

8. The flexible enclosure of claim 7, wherein the first volume is in the first flange and the second volume is in the second flange in locations that do not expose contents in the enclosure to the PCR material.

9. The flexible enclosure of claim 7, wherein the second volume in the second flange is sealed between the remainder of the second flange and the one or more films.

10. A method comprising:
extruding first and second flanges and locking members protruding from the flanges, each of the first and second flanges having opposite interior and exterior surfaces, the exterior surfaces of the first and second flanges configured to be coupled with one or more films of a flexible enclosure, the locking members configured to mate with each other to close the enclosure and to separate from each other to open the enclosure,
wherein the first flange includes a first volume that is thinner than the first flange and the second flange includes a second volume that is thinner than the second flange, the first volume only extending along and exposed to an external atmosphere along the interior surface of the first flange on a consumer side of the locking members, the second volume only extending along the exterior surface of the second flange on a product side of the locking members, the first and second volumes of the first and second flanges formed from a post-consumer recyclate (PCR) material and a remainder of the first and second flanges formed from a non-PCR material.

11. The method of claim 10, wherein the PCR material includes high density polyethylene (HDPE), and the non-PCR material is polyethylene (PE).

* * * * *